(12) United States Patent
Matalon et al.

(10) Patent No.: US 9,243,718 B2
(45) Date of Patent: Jan. 26, 2016

(54) DIAPHRAGM VALVE HAVING SPHERICALLY-SHAPED VALVE BODY AND DIAPHRAGM SEALING SURFACE

(75) Inventors: Louis E. Matalon, Lancaster, PA (US); Paul S. Gifford, Chattanooga, TN (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 475 days.

(21) Appl. No.: 13/595,652

(22) Filed: Aug. 27, 2012

(65) Prior Publication Data

US 2014/0054488 A1 Feb. 27, 2014

(51) Int. Cl.
F16K 7/12 (2006.01)

(52) U.S. Cl.
CPC .................................... F16K 7/126 (2013.01)

(58) Field of Classification Search
CPC ................................. F16K 7/12; F16K 7/126
USPC ........................ 251/331, 335.2, 359
See application file for complete search history.

(56) References Cited

U.S. PATENT DOCUMENTS

| | | | | |
|---|---|---|---|---|
| 1,800,157 A | * | 4/1931 | Saunders | 251/331 |
| 1,855,991 A | | 4/1932 | Saunders | |
| 2,716,017 A | | 8/1955 | Linker | |
| 3,148,861 A | * | 9/1964 | McFarland, Jr. | 251/331 |
| 3,263,875 A | | 8/1966 | Lofdahl | |
| 3,275,292 A | | 9/1966 | Boteler | |
| 3,300,844 A | | 1/1967 | Boteler | |
| 3,310,280 A | * | 3/1967 | Boteler | 251/331 |
| 3,310,281 A | | 3/1967 | Boteler | |
| 3,310,282 A | | 3/1967 | Boteler | |
| 3,349,795 A | | 10/1967 | Matsutani | |
| 3,374,522 A | | 3/1968 | Boteler | |
| 3,426,999 A | * | 2/1969 | Toinet | 251/331 |
| 3,479,696 A | | 11/1969 | Balhouse | |
| 3,628,770 A | * | 12/1971 | Rost | 251/331 |
| 3,719,343 A | | 3/1973 | Werra | |
| 3,874,636 A | * | 4/1975 | Bake et al. | 251/335.2 |
| 4,214,604 A | | 7/1980 | Rumsey | |
| 4,624,442 A | * | 11/1986 | Duffy et al. | 251/331 |
| 4,836,236 A | | 6/1989 | Ladisch | |
| 4,836,719 A | | 6/1989 | Field | |
| 5,065,980 A | * | 11/1991 | Pedersen | 251/331 |
| 5,123,439 A | | 6/1992 | Powers | |
| 5,127,430 A | | 7/1992 | Powers et al. | |
| 5,277,401 A | | 1/1994 | Butler et al. | |

(Continued)

FOREIGN PATENT DOCUMENTS

| | | |
|---|---|---|
| BE | 551707 | 10/1956 |
| CH | 316891 | 10/1956 |

OTHER PUBLICATIONS

BE551707—9 pages machine generated translation.

(Continued)

*Primary Examiner* — John Bastianelli

(57) ABSTRACT

A weir-type diaphragm valve includes a valve body having a spherically-shaped valve body sealing surface with a weir having a spherically-shaped weir sealing surface; and a diaphragm having a diaphragm sealing surface with a diaphragm weir sealing surface, the diaphragm responding to an applied force and providing sealing contact between the diaphragm weir sealing surface and the spherically-shaped weir sealing surface so as to stop the flow of fluid through a fluid flow channel of the valve body.

13 Claims, 3 Drawing Sheets

Valve Body having a Spherical Weir

(56) References Cited

U.S. PATENT DOCUMENTS

| | | |
|---|---|---|
| 5,632,465 A | 5/1997 | Cordua |
| 5,746,079 A | 5/1998 | Hettinger et al. |
| 6,009,684 A | 1/2000 | Buesing |
| 6,047,953 A | 4/2000 | Jacob, Jr. |
| 6,095,484 A * | 8/2000 | Frenkel .................. 251/331 |
| 6,416,038 B1 * | 7/2002 | Sindel et al. ................. 251/331 |
| 6,575,431 B2 | 6/2003 | Artsvelyan |
| 6,789,781 B2 | 9/2004 | Johnson et al. |
| 6,923,198 B2 | 8/2005 | McKenzie et al. |
| 7,100,894 B2 | 9/2006 | Newberg |
| 7,458,560 B2 | 12/2008 | Muller |
| 7,703,205 B2 | 4/2010 | McGuire et al. |
| 7,775,234 B2 | 8/2010 | Campisi |
| 7,789,012 B2 | 9/2010 | Marcilese et al. |
| 7,926,785 B2 | 4/2011 | Wincek |
| 2007/0262277 A1 | 11/2007 | Williams et al. |
| 2010/0071776 A1 * | 3/2010 | Ringer et al. ................. 251/331 |
| 2010/0140527 A1 * | 6/2010 | Glime ......................... 251/359 |
| 2010/0140528 A1 | 6/2010 | McLennan |
| 2012/0138835 A1 | 6/2012 | Hunter |

OTHER PUBLICATIONS

CH316891—6 pages machine generated translation.
1 page European Search Report EP13179972.

* cited by examiner

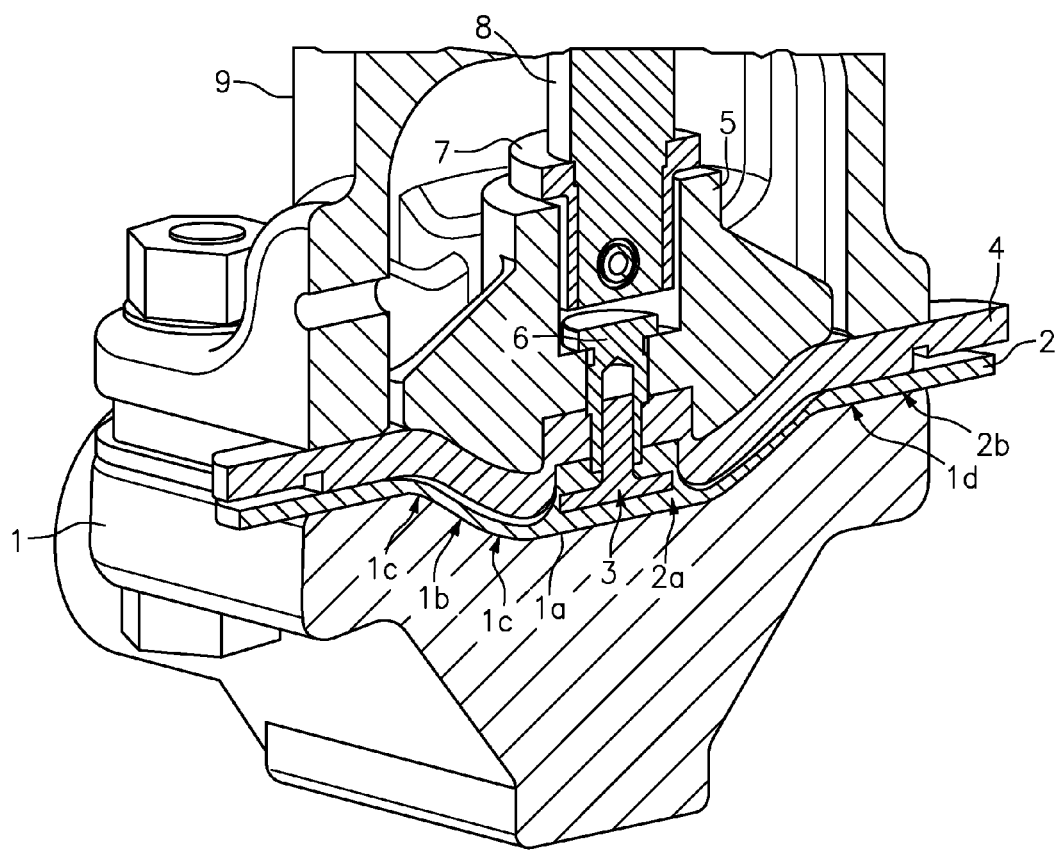
*FIG. 1*: Typical Weir Shape within the Diaphragm Valve (PRIOR ART)

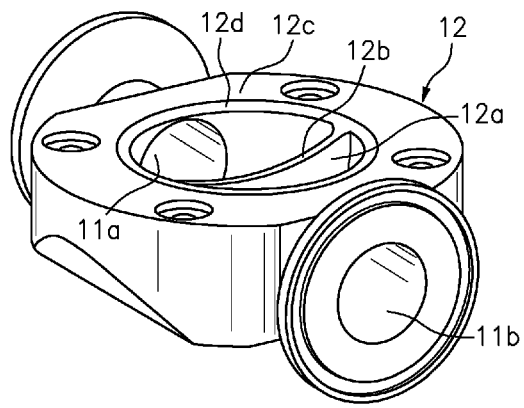
FIG. 2: Valve Body having a Spherical Weir
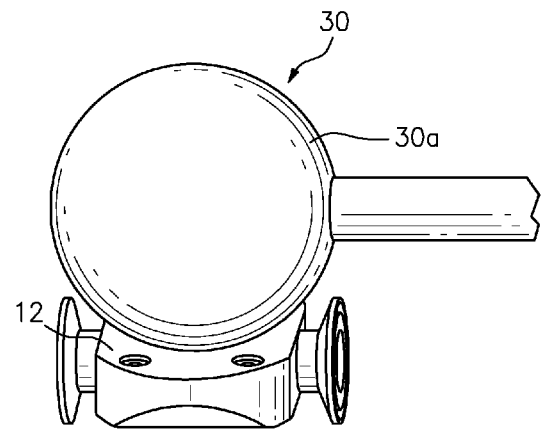
FIG. 3: Polish of Spherical Weir
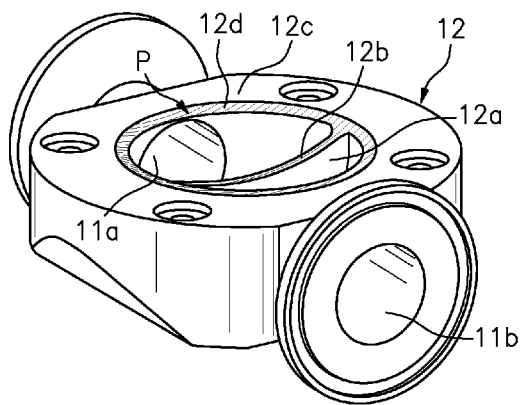
FIG. 3A

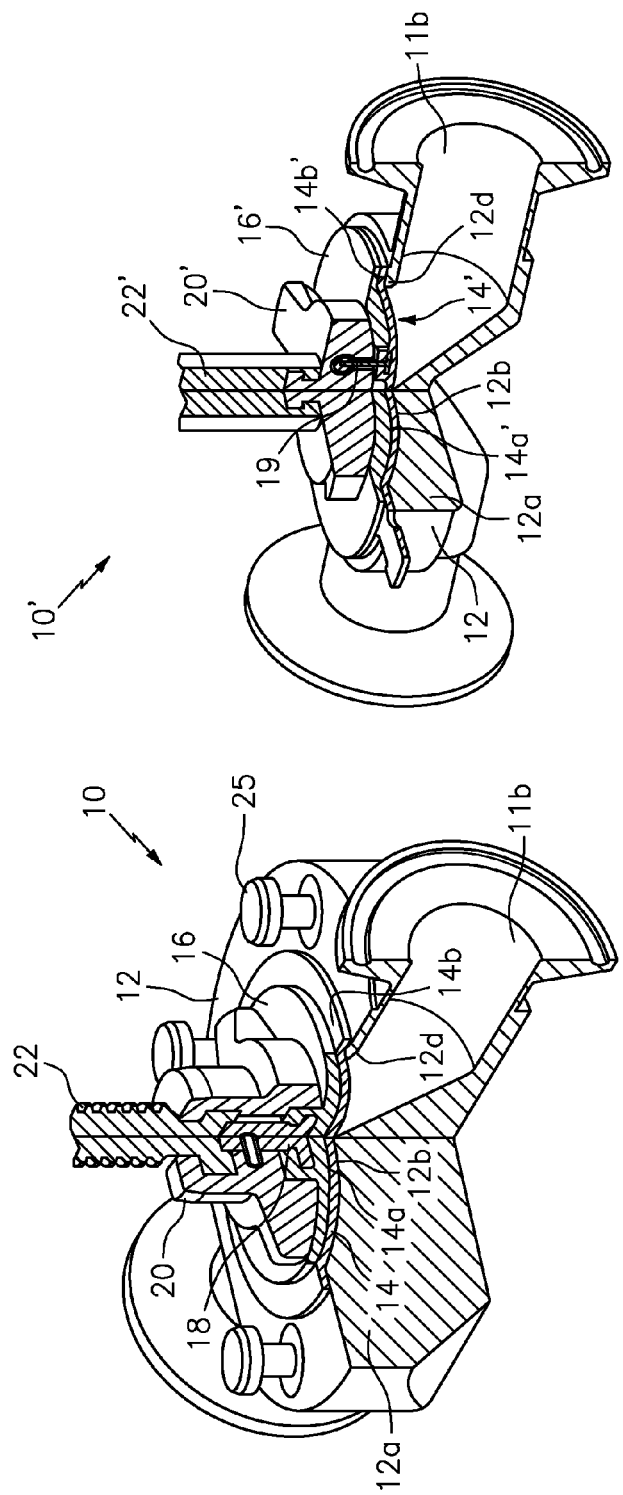
FIG. 4: Spherical Weir with Matching Diaphragm
FIG. 5: Non-Spherical Diaphragm use on Spherical Weir

DIAPHRAGM VALVE HAVING SPHERICALLY-SHAPED VALVE BODY AND DIAPHRAGM SEALING SURFACE

BACKGROUND OF THE INVENTION

1. Field of the Invention

The present invention relates to a diaphragm valve; and more particularly relates to a diaphragm valve having a weir.

2. Brief Description of Related Art

Historically, a mix of flat surfaces with filleted corners and compound curves have combined to form the valve body and diaphragm interface. Difficulties arise in valve sealing when the shape of the diaphragm must conform to geometric variations that arise from processing the diaphragms and/or valve bodies. In addition, the inversion of the diaphragm that is required to open and close the valve induces significant stress to the diaphragm, when corners and multiple thickness sections are present.

FIG. 1 shows a known weir valve having a valve body (1) and a typical Polytetrafluoroethylene (PTFE) diaphragm (2) which has a thick section or boss (2a) where an attachment stud (3) is embedded into the thick PTFE part (2a). The valve body (1) has a weir section (1a) with a bottom portion that is typically flat. The weir section (1a) also has a curved section (1b) and two fillets (1c) that are in a transition area between the center and a flanged section (1d). The diaphragm (2) in the closed position must match the complex weir geometry. When the weir valve is opened, the diaphragm (2) is pulled up, and the curved section matching the curved section (1b) reverses it's shape. Diaphragm deformation and stress are concentrated in the tight radius section (2b) which, when closed, meet the body filleted sections (1c).

The complex weir surface is also difficult to measure or gauge. Combined with hand polishing, there is likely inconsistency from one valve to another in weir shape. Inconsistency must be compensated by greater sealing force applied by the actuator, resulting in reduced sealing efficiency. This also results in greater variability to the required seal pressure. The higher actuator force needed to insure that all diaphragms seal results in increased diaphragm wear and shorter diaphragm life. It also requires more powerful actuation and supporting structure within the valve design.

In FIG. 1, the diaphragm valve also has some other known components, parts or elements, including a backing cushion (4) arranged on the diaphragm (2), a compressor (5) arranged on the backing cushion (4), a tube nut (6) arranged in the compressor (5) and coupled to the attachment stud (3), a spindle flange (7) also arranged in the compressor (5), a spindle (8) arranged in the spindle flange (7) and a bonnet portion (9) for coupling to the valve body (1), as shown.

See U.S. Pat. No. 3,310,281, which discloses a diaphragm valve having an opening surrounded by a rim which has a surface lying in a flat plane, and also having a weir that provides on its top surface a narrow band seating which is concave with respect to the top plane, has a generally straight center portion, and has curved end portions turning upward from ends of the generally straight center portion and then curving over the other way to blend smoothly and gradually with a rim surface, as described in column 5, the last two paragraph (lines 53-75). In U.S. Pat. No. 3,310,281, the narrow band seating is not disclosed as being circularly-shaped in two-dimensions or spherically-shaped in three dimensions.

SUMMARY OF THE INVENTION

According to some embodiments, the present invention may take the form of apparatus, including a weir-type diaphragm valve, that features a valve body configured with at least one spherically-shaped valve body sealing surface; and a diaphragm configured with at least one diaphragm sealing surface, and also configured to respond to an applied force and provide sealing contact between the at least one diaphragm sealing surface and the at least one spherically-shaped valve body sealing surface.

The present invention may also include one or more of the following Features:

According to some embodiments of the present invention, the valve body may be configured with a spherical weir having a spherically-shaped weir sealing surface as the at least one spherically-shaped valve body sealing surface. By way of example, the spherically-shaped weir sealing surface may be configured with polish marks substantially perpendicular to a weir leak path.

According to some embodiments of the present invention, the valve body may be configured with a circular rim having a spherically-shaped peripheral sealing surface as the at least one spherically-shaped valve body sealing surface. By way of example, the spherically-shaped peripheral sealing surface may be configured with polish marks, many of which are substantially perpendicular to a shell leak path.

According to some embodiments of the present invention, the valve body may be configured with a spherical weir having a spherically-shaped weir sealing surface as the at least one spherically-shaped valve body sealing surface, and the diaphragm may be configured with a diaphragm weir sealing surface as the at least one diaphragm sealing surface, and the diaphragm may also configured to respond to the applied force and provide the sealing contact between the diaphragm weir sealing surface and the spherically-shaped weir sealing surface so as to stop the flow of fluid through a fluid flow channel of the valve body.

According to some embodiments of the present invention, the shape of the diaphragm may be configured to match the shape of the weir and peripheral valve body sealing surfaces. For example, the diaphragm may be configured with at least a partially spherical shape, and the diaphragm weir sealing surface has a spherical shape to match substantially the spherically-shaped weir sealing surface.

According to some embodiments of the present invention, the diaphragm may be configured with a non-spherical shape, including a substantially flat shape.

According to some embodiments of the present invention, the spherically-shaped weir sealing surface may be configured with polish marks substantially perpendicular to a weir leak path, including being perpendicular to the flow of fluid through the fluid flow channel of the valve body, including where the polish marks are formed by a spherically-shaped polishing tool.

According to some embodiments of the present invention, the valve body may be configured with a circular rim having a spherically-shaped peripheral sealing surface as the at least one spherically-shaped valve body sealing surface, and the diaphragm is configured with a diaphragm peripheral sealing surface as the at least one diaphragm sealing surface, and the diaphragm may also configured to respond to the applied force and provide the sealing contact between the diaphragm peripheral sealing surface and the spherically-shaped peripheral sealing surface so as to prevent the leaking of the fluid from the valve body via a shell leak path.

Other Components of the Weir-Type Diaphragm Valve

According to some embodiments of the present invention, the apparatus may further comprise a backing cushion configured with a corresponding spherical shape to match substantially the spherical shape of the diaphragm weir sealing surface.

According to some embodiments of the present invention, the apparatus may further comprise a compressor configured with at least a partially spherical shape to match substantially the diaphragm weir sealing surface.

According to some embodiments of the present invention, the diaphragm may be configured with at least a partially spherical shape, and the diaphragm weir sealing surface may have a spherical shape to match substantially the spherically-shaped weir sealing surface.

Radius of Curvature

According to some embodiments of the present invention, the spherically-shaped weir sealing surface and the spherically-shaped peripheral sealing surface may each have a respective radius of curvature that are substantially equal. The respective radius of curvature may correspond to a corresponding radius of a spherically-shaped polishing tool used to form the spherically-shaped weir sealing surface and the spherically-shaped peripheral sealing surface.

According to some embodiments of the present invention, alternatively the spherically-shaped weir sealing surface and the spherically-shaped peripheral sealing surface may each have a respective radius of curvature that are different. For example, the spherically-shaped weir sealing surface may have a first radius of curvature that corresponds to a first radius of a first spherically-shaped polishing tool used to form the spherically-shaped weir sealing surface, and the spherically-shaped peripheral sealing surface may have a second radius of curvature that corresponds to a second radius of a second spherically-shaped polishing tool used to form the spherically-shaped peripheral sealing surface. Further, by way of example, the first radius of curvature is greater than the second radius of curvature; or the first radius of curvature may be less than the second radius of curvature.

Summary and Advantages

In summary, the present invention utilizes a generally single spherical cap to define the entire sealing surface of the valve body. This eliminates corners and transitions to the surface sealing against the diaphragm. The diaphragm shape away from the weir may, but does not need to, conform to the spherical shape of the body.

Some advantages of the present invention include the following:

1. Machine Lapping or Polishing of the body sealing surfaces can be achieved with a spherical shaped tool, allowing greater precision for improved valve performance, and creates polish marks perpendicular to the weir leak path, further improving the seal efficiency.
2. Still allows for a circular rim polish (perpendicular to the shell leak path) possibly using a tool having a slightly larger radius than the weir seal polishing tool.
3. The sealing area can be easily and accurately validated with CMM equipment and/or gages.
4. Lower energy sealing is possible with tighter surface tolerances.
5. Stress concentrations are eliminated from the central area of the diaphragm.
6. The center weir can be made thin without risk of shape deformation from hand polishing,
    a) The thin weir improves process flow.
    b) The thin weir may be used to concentrate the weir seal pressure without use of a diaphragm bead.
        i) This allows for less expensive sheet diaphragm manufacturing rather than molded
        ii) Diaphragm orientation during assembly may not be required.
        iii) Elimination of a diaphragm bead improves process flow.
7. The peripheral seal may be made on the spherical body surface.

BRIEF DESCRIPTION OF THE DRAWING

The drawing includes the following Figures, not necessarily drawn to scale:

FIG. 1 shows an isometric view cut along a weir centerline of a diaphragm valve having a typical weir shape that is known in the art.

FIG. 2 shows a valve body with a spherical weir according to some embodiments of the present invention.

FIG. 3 shows in combination a valve body and a polishing member, wherein the polish of the spherical weir is followed by a circular finish around the top rim (Both polish marks perpendicular to leak paths).

FIG. 3A shows polished marks P formed on a spherically-shaped weir sealing surface and a spherically-shaped peripheral sealing surface of the valve body shown in FIGS. 2-3 by a spherically-shaped polishing tool having a polishing member shown in FIG. 3, according to some embodiments of the present invention.

FIG. 4 shows part of a diaphragm valve having a spherical weir with a matching diaphragm according to some embodiments of the present invention.

FIG. 5 shows part of a diaphragm valve having a spherical weir with a non-spherical diaphragm, according to some embodiments of the present invention.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

FIGS. 2-5 show the present invention in the form of apparatus generally indicated as 10, 10', including a weir-type diaphragm valve, that features a valve body 12 configured with at least one spherically-shaped valve body sealing surface 12b, 12d; and a diaphragm 14 configured with at least one diaphragm sealing surface 14a, 14b, and also configured to respond to an applied force and provide sealing contact between the at least one diaphragm sealing surface 14a, 14b and the at least one spherically-shaped valve body sealing surface 12b, 12d. The valve body 12 includes fluid flow channels 11a, 11b (FIG. 2) for passing fluid through the weir-type valve 12.

Consistent with that shown in FIGS. 2-4, the present invention may be implemented so as to utilize a single spherical cap 14 to define the entire sealing surface of the valve body 12. This eliminates corners and transitions in the diaphragm 14 in the sealing area of the valve 12. The diaphragm shape away from the spherical weir 12a may, but does not need to, conform to the spherical shape of the valve body 12.

In FIGS. 2-5, the valve body 12 may be configured with a spherical weir 12a having a spherically-shaped weir sealing surface 12b as the at least one spherically-shaped valve body sealing surface. By way of example, the spherically-shaped weir sealing surface 12b may be configured with polish marks substantially perpendicular to a weir leak path, which is understood to be paths in the direction of the fluid flow through the valve body, e.g., from the fluid flow channel 11a to fluid flow channel 11b. The diaphragm 14 may be configured with a diaphragm weir sealing surface 14a as the at least one diaphragm sealing surface. In operation, the diaphragm 14 may also configured to respond to the applied force and provide the sealing contact between the diaphragm weir sealing surface 14a and the spherically-shaped weir sealing surface 12b so as to stop the flow of fluid through the fluid flow channel 11a, 11b of the valve body 12.

The valve body 12 may also be configured with a circular or peripheral rim 12c having a spherically-shaped peripheral sealing surface 12d as the at least one spherically-shaped valve body sealing surface. By way of example, the spherically-shaped peripheral sealing surface 12d may be configured with polish marks, many of which are substantially perpendicular to a shell leak path, which is understood to be the radial leak path through the spherically-shaped peripheral sealing surface 12d. The diaphragm may be configured with a diaphragm peripheral sealing surface 14b as the at least one diaphragm sealing surface. In operation, the diaphragm 14 may also configured to respond to the applied force and provide the sealing contact between the diaphragm peripheral sealing surface 14h and the spherically-shaped peripheral sealing surface 12d so as to prevent the leaking of the fluid from the valve body via the shell leak path.

Consistent with that shown in FIG. 3, the polish marks may be formed by a spherically-shaped polishing tool generally indicated as 30 having a polishing member 30a. The polishing member is understood to have a radius R that defines the spherical polishing surface.

Consistent with that shower in FIG. 4, the diaphragm 14 may be configured with at least a partially spherical shape. For example, the diaphragm weir sealing surface 14a may be configured with a spherical shape to match substantially the spherically-shaped weir sealing surface 12b, and/or the diaphragm peripheral sealing surface 14b may be configured with a corresponding spherical shape to match substantially the spherically-shaped peripheral sealing surface 12d. The spherically-shapes conformity of the weir sealing surfaces 12a, 12b and the diaphragm sealing surfaces 14a, 14b will increase and improve the overall sealing contact between these corresponding sealing surfaces 12a, 14a; 12b, 14b.

Other Components of the Weir-type Diaphragm Valve

Consistent with that shown in FIG. 4, the apparatus 10 may also include a backing cushion 16, a diaphragm stud 18, a compressor 20, and a spindle 22.

The scope of the invention is intended to include embodiments wherein the backing cushion 16 may be configured with a corresponding spherical shape to match substantially the spherical shape of the diaphragm weir sealing surface 14a, as shown in FIG. 4.

The scope of the invention is also intended to include embodiments wherein the compressor 20 may be configured with at least a partially spherical shape to match substantially the diaphragm weir sealing surface 14a.

The scope of the invention is also intended to include embodiments wherein the diaphragm 14 may be configured with at least a partially spherical shape, and the diaphragm weir sealing surface 14a may have a spherical shape to match substantially the spherically-shaped weir sealing surface 12b.

In FIG. 4, the valve body 12 is also shown having shouldered pins, one of which is identified with reference label 25, that cooperate with keyways (not shown) for rotationally coupling the valve body 12 and a bonnet portion (not shown), consistent with that disclosed in patent application Ser. No. 13/554,532 filed 20 Jul. 2012, entitled "Quick Connect, Post Energized Flanged Joint for a Diaphragm Valve (911-002.046-1//F-EV-1101US), which is hereby incorporated by reference in its entirety.

FIG. 5

Consistent with that shown in FIG. 5, the weir-type diaphragm valve 10' has the diaphragm 14' which may be configured with a non-spherical shape, including being a substantially flat shape. Since the diaphragm 14' is made of an elastomeric material, such as PTFE, in operation it will respond to the applied force, suitable stretch and provide the sealing contact between the at least one diaphragm sealing surface 14a, 14b and the at least one spherically-shaped valve body sealing surface 12b, 12d, as shown in FIG. 4.

In FIG. 5, components and parts of the weir-type diaphragm valve 10' that correspond to similar components and parts as the weir-type diaphragm valve 10 in FIGS. 2-4 are labeled with similar reference numerals or labeled with similar reference numerals having an accent "'" including a backing cushion 16', a compressor 20' and a spindle 22'. In addition, the weir-type diaphragm valve 10' also includes studs, one of which is shown and identified with reference label 19 that is coupled between the diaphragm 14' and compressor 20' and arranged on each side of the spherical weir 12a for sealing she diaphragm weir sealing surface 14a and the spherically-shaped weir sealing surface 12b so as to stop the flow of fluid through the fluid flow channel 11a, 11b of the valve body 12, consistent with that disclosed in patent application Ser. No. 13/554,535, filed 20 Jul. 2012, entitled "Two-stud Diaphragm for Diaphragm Valve," (911-002.049-1//F-EV-1201US), which is hereby incorporated by reference in its entirety. The reader is also referred to related patent application Ser. No. 13/554,541, filed 20 Jul. 2012, entitled "Temperature Compensating Flanged Joint for a Teflon Diaphragm Valve, (911-002.051//F-EV-1202US), which is hereby incorporated by reference in its entirety.

Polytetrafluoroethylene (PTFE)

By way of example, the diaphragm 14 may be made of, or configured from Polytetrafluoroethylene (PTFE), which is a synthetic fluoropolymer of tetrafluoroethylene that is known in the art, although the scope of the invention is intended to include the diaphragm being made from other types or kinds of materials either now known or later developed in the future.

Sphere

A person skilled in the art would understand and appreciate that a sphere is a perfectly round geometrical object in three-dimensional space, such as the shape of a round ball. Like a circle, which is in two dimensions a sphere is the set of points which are all the same distance r from a given point in space. This distance r is known as the "radius" of the sphere, and the given point is known as the center of the sphere. The maximum straight distance through the sphere is known as the "diameter". It passes through the center and is thus twice the radius.

The spherically-shaped weir sealing surface 12b and the spherically-shaped peripheral sealing surface 12d are understood to be configured on, or formed part of, the valve body 12 having respective spherical shapes in three dimensions, consistent with this appreciate of what a sphere is understood to be.

Moreover, consistent with that shown in FIG. 4, for embodiments in which the diaphragm 14 are configured with at least a partially spherical shape, the spherically-shaped diaphragm weir sealing surface 14a and the spherically-shaped diaphragm peripheral sealing surface 14b are understood to have respective spherical shapes in three dimensions, also consistent with this appreciate of what a sphere is understood to be.

The Radius of Curvature

According to some embodiments, the spherically-shaped weir sealing surface 12b and the spherically-shaped peripheral sealing surface 12d may each have a respective radius of curvature that are substantially equal. The respective radius of curvature may correspond to the radius R that defines the spherical polishing surface of the polishing member 30a in FIG. 3.

However, the scope of the invention is not intended to be limited to any particular relationship between the respective radius of curvature of the spherically-shaped weir sealing surface 12b and the spherically-shaped peripheral sealing surface 12d.

For example, alternatively the scope of the invention is intended to include embodiments where the spherically-shaped weir sealing surface 12b and the spherically-shaped peripheral sealing surface 12d may each have a respective radius of curvature that are different. For example, the spherically-shaped weir sealing surface 12b may have a first radius of curvature that corresponds to a first radius of a first spherically-shaped polishing tool like the tool shown in FIG. 3 used to form the spherically-shaped weir sealing surface 12b, while the spherically-shaped peripheral sealing surface 12d may have a second radius of curvature that corresponds to a second radius of a second and different spherically-shaped polishing tool than that used in FIG. 3 to form the spherically-shaped peripheral sealing surface 12b.

Further, by way of example, the first radius of curvature may be greater than the second radius of curvature; or the first radius of curvature may be less than the second radius of curvature.

A person skilled in the art would understand that, in geometry, the radius of curvature, R, of a curve at a point is a measure of the radius of the circular arc which best approximates the curve at that point.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claim is:

1. A weir-type diaphragm valve, comprising:
a valve body configured with fluid flow channels for passing fluid through the weir-type diaphragm valve, configured with a weir having a spherically-shaped weir sealing surface, and also configured with a peripheral rim having a spherically-shaped peripheral sealing surface, the spherically-shaped weir sealing surface and spherically-shaped peripheral sealing surface having polish marks that are substantially perpendicular to the flow of fluid passing through the fluid flow channels of the valve body; and
a diaphragm configured with a diaphragm weir sealing surface and a diaphragm peripheral sealing surface, and also configured to respond to an applied force, provide sealing contact between the diaphragm weir sealing surface and the spherically-shaped weir sealing surface so as to stop the flow of fluid passing through the fluid flow channels of the valve body, and provide corresponding sealing contact between the diaphragm peripheral sealing surface and the spherically-shaped peripheral sealing surface so as to prevent leaking of the fluid from the valve body via a shell leak path.

2. Apparatus according to claim 1, wherein the polish marks on the spherically-shaped weir sealing surface are substantially perpendicular to a weir leak path, and many of the polish marks on the spherically-shaped peripheral sealing surface are substantially perpendicular to the shell leak path.

3. A weir-type diaphragm valve according to claim 1, wherein the diaphragm is configured with at least a partially spherical shape, and the diaphragm weir sealing surface has a spherical shape to match substantially the spherically-shaped weir sealing surface.

4. A weir-type diaphragm valve according to claim 1, wherein the diaphragm is configured with a non-spherical shape, including a substantially flat shape.

5. A weir-type diaphragm valve according to claim 1, wherein the polish marks are formed by a spherically-shaped polishing tool.

6. A weir-type diaphragm valve according to claim 1, wherein the spherically-shaped weir sealing surface and the spherically-shaped peripheral sealing surface each have a respective radius of curvature that are substantially equal.

7. A weir-type diaphragm valve according to claim 6, wherein the respective radius of curvature corresponds to a corresponding radius of a spherically-shaped polishing tool used to form the spherically-shaped weir sealing surface and the spherically-shaped peripheral sealing surface.

8. A weir-type diaphragm valve according to claim 1, wherein the spherically-shaped weir sealing surface and the spherically-shaped peripheral sealing surface each have a respective radius of curvature that are different.

9. A weir-type diaphragm valve according to claim 8, wherein the spherically-shaped weir sealing surface has a first radius of curvature that corresponds to a first radius of a first spherically-shaped polishing tool used to form the spherically-shaped weir sealing surface, and the spherically-shaped peripheral sealing surface has a second radius of curvature that corresponds to a second radius of a second spherically-shaped polishing tool used to form the spherically-shaped peripheral sealing surface, including either where the first radius of curvature is greater than the second radius of curvature; or where the first radius of curvature is less than the second radius of curvature.

10. A weir-type diaphragm valve according to claim 1, wherein the weir-type diaphragm valve further comprises a backing cushion configured with a corresponding spherical shape to match substantially the spherical shape of the diaphragm weir sealing surface.

11. A weir-type diaphragm valve according to claim 10, wherein the weir-type diaphragm valve further comprises a compressor configured with at least a partially spherical shape to match substantially the diaphragm weir sealing surface.

12. A weir-type diaphragm valve according to claim 1, wherein the weir-type diaphragm valve further comprises a compressor configured with at least a partially spherical shape to match substantially the diaphragm weir sealing surface.

13. A weir-type diaphragm valve according to claim 1, wherein the diaphragm is configured with at least a partially spherical shape and the diaphragm weir sealing surface has a spherical shape to match substantially the spherically-shaped weir sealing surface.

* * * * *